United States Patent [19]

Lehner et al.

[11] Patent Number: 5,470,650
[45] Date of Patent: Nov. 28, 1995

[54] MAGNETIC RECORDING MEDIA

[75] Inventors: August Lehner, Roedersheim-Gronau; Norbert Schneider, Altrip; Hermann Roller, Ludwigshafen; Werner Balz, Limburgerhof; Werner Lenz, Bad Duerkheim; Albert Kohl, Laumersheim, all of Germany

[73] Assignee: Basi Magnetics GmbH, Mannheim, Germany

[21] Appl. No.: 107,052

[22] Filed: Aug. 17, 1993

[30] Foreign Application Priority Data

Aug. 22, 1992 [DE] Germany .................. 42 27 870.8

[51] Int. Cl.$^6$ ................ B32B 5/16; B32B 9/04; G11B 5/66; B05D 5/12
[52] U.S. Cl. ........... 428/323; 428/327; 428/402; 428/405; 428/447; 428/451; 428/694 B; 428/694 BN; 428/694 BU; 427/127; 427/128; 427/130
[58] Field of Search ............ 428/694 B, 694 BU, 428/694 BN, 447, 402, 323, 327, 405, 451, 900; 427/127, 128, 130

[56] References Cited

U.S. PATENT DOCUMENTS

| | | | |
|---|---|---|---|
| 2,654,681 | 10/1953 | Lueck | 428/447 |
| 2,871,218 | 1/1959 | Schollenberger | 525/440 |
| 4,320,171 | 3/1982 | Motz et al. | 428/423.1 |
| 4,409,300 | 11/1983 | Ohkawa | 428/695 |
| 4,416,947 | 11/1988 | Yodo | 428/447 |
| 4,436,786 | 3/1984 | Ohkawa | 428/447 |
| 4,446,205 | 5/1984 | Mizuno | 428/327 |
| 4,567,109 | 1/1986 | Lehner et al. | 428/425.9 |
| 4,568,612 | 2/1986 | Lehner et al. | 428/425.9 |
| 4,649,081 | 3/1987 | Ogawe | 428/447 |
| 4,743,487 | 5/1988 | Saito et al. | 428/141 |
| 4,965,125 | 10/1990 | Masaki | 428/329 |
| 5,051,318 | 9/1991 | Nishikawa | 428/692 |
| 5,270,109 | 12/1993 | Nishikawa | 428/336 |

FOREIGN PATENT DOCUMENTS

| | | |
|---|---|---|
| 3226995 | 1/1984 | Germany . |
| 4157616 | 5/1992 | Japan . |

OTHER PUBLICATIONS

Database WPI, Week 8740, An 87–281110, Derwent Publications, (English language abstract of JP–A 62 195 730).
Database WPI, Week 9228, AN 92–231564, Derwent Publications, (English language abstract of JP–° 4 157 616).

*Primary Examiner*—L. Kiliman
*Attorney, Agent, or Firm*—Keil & Weinkauf

[57] ABSTRACT

Magnetic recording media are obtained by preparing a dispersion of anisotropic magnetic material and conventional additives in a solution of a polymeric binder in an organic solvent, applying the dispersion as a layer to a nonmagnetizable substrate, then orienting the anisotropic magnetic material in a magnetic field and solidifying the applied magnetic layer, the magnetic layer containing finely divided organic, hydrophobic supporting pigments and a highly viscous polysiloxane.

1 Claim, No Drawings

MAGNETIC RECORDING MEDIA

The present invention relates to magnetic recording media, obtained by preparing a dispersion of anisotropic magnetic material and conventional additives in a solution of a polymeric binder in an organic solvent, applying the dispersion as a layer to a nonmagnetizable substrate, then orienting the anisotropic material in a magnetic field and solidifying the magnetic layer.

Magnetic recording media which are used in modern audio and video recording and playback apparatuses have to meet various requirements. In addition to the high requirements with regard to the recording and playback properties for the use of audio tapes, video tapes and flexible data media, which are continuously being improved, constant adaptation and improvement is demanded, especially with regard to the mechanical properties. The magnetic layers must be very flexible and have high elasticity and high tensile strength. Furthermore, to avoid drops in output level, a reduction in the coefficient of friction, an increase in the abrasion resistance and resistance to wear and an improvement in the stability when exposed to heat and humidity are increasingly becoming necessary. Since in addition the magnetic layers of the recording media have to be increasingly smooth to record higher and higher frequencies, the problem arises that such smooth magnetic layers block during playback even at slightly elevated temperatures of about 30° C. and high atmospheric humidity. The calendering process is particularly critical since compaction of the magnetic layer takes place at elevated temperatures of up to 100° C. and at high pressure. Consequently, the magnetic recording media become useless and smear, deposits form on the recording and playback heads or the tapes block at high atmospheric humidity, in particular in conjunction with high temperature.

In order to avoid these defects, apart from using particularly suitable magnetic pigments it is necessary to choose all materials contained in the magnetic layers so that the magnetic layers have a particularly high magnetization in the recording direction and, with the required smooth surfaces, also have the absolutely essential mechanical properties. Particularly the improvement in the stated properties, such as uniform surface roughness, in conjunction with good residual induction and orientation ratio and ensuring excellent mechanical properties are highly dependent in one and the same magnetic material on the preparation of the magnetic layer, of the binder used and of the additives. Additives are primarily the lubricants, water repellants and dispersants, which have a substantial effect on the electroacoustic, magnetic and mechanical properties of the magnetic recording media.

The reduction in the surface roughness of the magnetic layer is particularly important in the case of high quality magnetic recording media, since particularly good tape/head contact is required for the resolution of very small wavelengths. This gives rise to the high requirements which are set with regard to the frictional properties or wear resistance of the tapes, since damage to the magnetic layer immediately leads to drops in output level.

Very many approaches have been tried to date for solving these problems, for example the addition of water repellants, subsequent application of lubricants to the magnetic layer, an increase in the surface hardness of the magnetic layer by crosslinking and the addition of nonmagnetic pigments, binder combinations of from two to four binder components, which may additionally be crosslinked. A large number of measures proposed to date often have considerable deficiencies in terms of process engineering, is they meet the requirements only insufficiently, if at all. Particularly high requirements are increasingly being set with regard to the running properties of the magnetic recording media under extreme climatic conditions, in particular at high atmospheric humidity and high temperature. Attempts to solve these problems often involve the addition of small amounts of specific lubricants or fillers, which were mixed in during dispersing of the magnetic materials or during the production of the magnetic layer. Examples of such additives are fatty acids or isomerized fatty acids, such as stearic acid or salts thereof with metals of the first to fourth main group of the Period Table of elements, amphoteric electrolytes, such as lecithin, and fatty esters, fatty amides, silicone oils or carbon black. Particularly in combination, these products result in very good running properties under conventional temperature and humidity conditions. Under extreme temperature and humidity conditions, such tapes are suitable only to a limited extent for operation at high atmospheric humidity and temperatures up to 85° C., even with the use of special binder systems as used, for example, for audio and video tapes having an extended dynamic range. Thus, by combining conventional low molecular weight liquid, highly crosslinked or solid, linear paraffins having a melting point below 80° C. it was not possible to produce magnetic tapes which, under the conditions described above, combine all required properties, such as good separation of the tape layers after storage at elevated temperatures, good sliding action, high water repellancy of the layer, increased scratch resistance, insolubility in the solvent used, reduction in head abrasion and good dispersibility. Even when using nonmagnetic inorganic pigments, such as ZnO, $SiO_2$, $Al_2O_3$, $Fe_2O_3$ or FeOOH powder, the performance characteristics such as no sticking of the tape layers, no smearing, low abrasion and poor wetting with water could not be achieved on storage under high temperature and humidity conditions or at 85° C.

SUMMARY OF THE INVENTION

It is an object of the present invention to provide magnetic recording media which exhibit an improvement in the performance characteristics, such as lower head abrasion, less water absorption, increased scratch resistance and smaller fluctuations in tape running, even under high and changing temperature loads and atmospheric humidities, ie. no impairment of magnetic properties, without a deterioration in the magnetic properties.

We have found that this object is achieved by magnetic recording media obtained by preparing a dispersion of anisotropic magnetic material and conventional additives in a solution of a polymeric binder in an organic solvent, applying the dispersion as a layer to a nonmagnetizable substrate, then orienting the anisotropic magnetic material in a magnetic field and solidifying the applied magnetic layer, if a finely divided, organic, hydrophobic supporting pigment which is insoluble in the solvent used and has a melting point of more than 90° C. is present in the magnetic layer in an amount of from 0.1 to 8% by weight in combination with from 0.1 to 1.5% by weight of highly viscous polysiloxane having a viscosity of from 10,000 to 500,000 mPa.s, the percentages in each case being based on the amount of magnetic material.

DETAILED DESCRIPTION OF THE PREFERRED EMBODIMENTS

The term "supporting pigments" as used in the context of this invention shall mean that the pigments have a reinforcing and spacer function in the magnetic layer.

Suitable finely divided organic supporting pigments for the novel magnetic recording media are polyethylene or polypropylene having a molecular weight of from 2,000 to 10,000, preferably from 2,500 to 7,000, if they are insoluble in the solvent used for the magnetic dispersion and having a melting point (monoscope) of > 90° C. Finely micronized, spherical polyethylenes/polypropylenes having a particle diameter of less than 30 µm, in particular less than 10 µm, and a melting point of > 95° C. have proven particularly advantageous. It is also advantageous if the pigments have a hardness of from > 150 to 400 bar (Höppler hardness at 23° C. according to D6F-M-IN 8).

Copolymers and reaction products based on polyethylene, such as ethylene/acrylic acid polymers, ethylene/vinyl acetate polymers, or oxidized polyethylenes, are also suitable provided that the boundary conditions described above, ie. mp. > 90° C. insoluble in the solvent used, finely divided nature and molecular weight from 2,000 to 10,000, are maintained.

The high molecular weight polysiloxanes present in the magnetic layer in addition to the organic supporting pigments defined preferably have a viscosity of from 10,000 to 100,000, in particular from 20,000 to 80,000, mPa.s, the amount advantageously being from 0.15 to 0.75% by weight, based on the magnetizable material. Polysiloxanes based on dimethylsiloxanes are preferable.

The disadvantageous performance characteristics of the recording media, such as sticking and smearing, can be prevented by the additives, in particular under extreme environmental conditions, for example high atmospheric humidity and/or high temperatures. Low molecular weight or chemically modified silicone oils have preferably been used to date, as is known in the processing of varnishes. High molecular weight polydimethylsiloxanes are very slightly soluble and incompatible. This leads to a strong tendency to pitting and to the so-called hammer dimple effect. It was therefore all the more surprising that, in combination with finely divided organic supporting pigments, the running problems were substantially improved and the disadvantages in the running behavior which are known with the use of low molecular weight silicone oils or modified silicone oils, for example wow and flutter, did not occur.

The composition and production of the novel magnetic recording media are known.

A preferably used magnetic material is finely divided acicular gamma-iron(III) oxide having a mean particle size of from 0.1 to 2 µm, in particular from 0.1 to 0.9 µm, or acicular chromium dioxide having the same particle structure as stated for the iron oxide. Further suitable materials are gamma-iron(III) oxide doped with heavy metals, in particular with cobalt, and finely divided metal alloys of iron, cobalt and/or nickel. Finely divided chromiumdioxide is particularly suitable. Mixtures of pigments are also suitable.

The binders forming the magnetizable layer contain at least 40% by weight of polyurethanes. For example, solvent-containing polyurethane elastomers as described, for example, in DE-B 11 06 959 or DE-B 27 52 694 are suitable for this purpose. Further suitable polyurethanes are disclosed in DA-A 32 26 995, 32 27 163 and 32 27 164. The polyurethanes may be used as the sole binder or, preferably as mixtures with other polymers (for example polyvinyl formals, phenoxy resins or PVC copolymers). From 10 to 40% by weight of the second binder component is preferably added. In the case of these binders, it is particularly advantageous that additional dispersants can be completely or partially dispensed with.

For crosslinking of the magnetic recording media which may be required depending on binder system and tape property profile, the reaction of the polyurethanebinders or polyurethane binders mixtures with polyisocyanates is suitable. A large number of organic di-, tri- or polyisocyanates or isocyanate prepolymers having a molecular weight of up to 10,000, preferably from 500 to 3,000, can be used for the crosslinking. Polyisocyanates which carry more than 2 NCO groups per molecule are preferred. Polyisocyanates based on toluylene diisocyanate, hexamethylene diisocyanate or isophorone diisocyanate and formed by polyaddition with di- or triols or by biuret and isocyanurate formation have proven particularly suitable. An adduct of toluylene diisocyanate with trimethylolpropane and diethylene glycol is particularly advantageous. The amount of polyisocyanate used must be adapted to the particular binder system.

Water, cyclic ethers, such as tetrahydrofuran and dioxane, and cyclic ketones, such as cyclohexanone, are used as solvents, depending on the binder used. The polyurethanes are also soluble in other strongly polar solvents, such as dimethylformamide, N-methylpyrrolidone, dimethyl sulfoxide or ethylglycol acetate. It is also possible to mix the stated solvents with aromatics, such as toluene or xylene, and esters, such as ethyl or butyl acetate.

In general, further additives for improving the magnetic layer are added to the dispersions of magnetic material and binder. Examples of additives are fatty acids, polycarboxylic acids, mono-, di- or polysulfonic acids or phosphoric acids, mixtures thereof, esters or salts with metals of the first to fourth group of the Periodic Table, lecithins, and fluorocarbons, as well as fillers, such as carbon black, graphite, quartz powder and/or nonmagnetizable powders based on silicates or on iron oxide. The total amount of such additives is usually below 10% by weight, based on the magnetic layer.

The amount of organic supporting pigment which is typical for the novel magnetic recording media is reached by adding these substances before or at the end of the dispersing process. Pigment pastes, which are mixed with the magnetic dispersion, are also suitable. This results in a good, uniform distribution. If further conventional additives which also enhance the dispersing in addition to other effects, such as improvement of the frictional properties and of the running, are used for producing the magnetizable layer, the advantageous properties are retained by the addition of the novel additives. The high molecular weight polysiloxane is mixed in shortly before the application of the dispersion to the substrate.

The magnetizable layers are produced in a known manner. For this purpose, the magnetic material is dispersed with the binder used and sufficient solvent in a dispersing apparatus, for example a tubular ball mill or a stirred ball mill, with or without the addition of the further additives. To obtain the advantageous binder/pigment ratio, these may be added to the mixture either in solid form or in the form of from 10 to 60% strength solutions or of from 20 to 60% strength dispersions. It has proven advantageous to continue the dispersing until an extremely fine distribution of the magnetic material has been reached, which may take from 1 to 5 days. Subsequent repeated filtration gives a completely homogeneous magnetic dispersion. Any crosslinking agents necessary are added to the dispersion prior to coating.

The magnetic dispersion is then applied to the nonmagnetic substrate with the aid of a conventional coating apparatus, for example a knife coater. The nonmagnetic substrates used may be the conventional substrates, in particular of from 6 to 36 μm. Before the still liquid coating mixture is dried on the substrate, which is advantageously effected at from 50° to 100° C. in the course of from 0.2 to 5 minutes, the anisotropic magnetic particles are oriented by the action of a magnetic field along the intended recording direction. The magnetic layers can then be calendered and compacted on conventional machines by being passed between heated and polished rollers, if necessary under pressure and at from 20° to 100° C., preferably from 40° to 80° C. The thickness of the magnetic layer is in general from 1 to 20 μm, preferably from 2 to 12 μm.

Compared with recording media which do not contain the organic supporting pigments and the polysiloxane in the magnetic layer, the novel recording media have substantially improved stability to the chemical degradation caused by humidity and oxidizable compounds. This means that, in particular, the undesirable decomposition which has a very adverse effect on the magnetic properties, for example when chromium dioxide is used, ie. the disproportionation to give chromate and chromium(III) ions, is suppressed.

The Examples which follow illustrate the invention in comparison with prior art experiments. In the Examples and Comparative Experiments which follow, parts and percentages are by weight, unless stated otherwise. The magnetic properties were measured using a vibrating sample magnetometer in a magnetic field of 100 kA/m. The coercive force $H_c$ in [kA/m], the residual magnetization $M_r$ and the saturation magnetization $M_m$ in [mT] and the orientation ratio Rf, which is the ratio of the residual magnetization in the playing direction to that in the crosswise direction, were determined. In addition, the stability of the magnetic recording medium was investigated by measuring the chromate formation by the eluate test according to DIN 38,414/page 4 and a total chromium determination on the stated eluate.

EXAMPLE 1

100 parts by weight of ferromagnetic chromium dioxide having a mean particle size of 0.5 μm and a length/width ratio of 4:1 were dispersed together with 33.9 parts by weight of 16.5% strength solution of a polyurethane elastomer, 5.6 parts by weight of a 20% strength solution of a polyvinyl formal, consisting of 82% of vinyl formal units, 12% of vinyl acetate units and vinyl alcohol units, 0.5 part by weight of N-tallow fatty-1,3-diamine oleate, 2 parts by weight of zinc stearate, 0.6 part by weight of linseed oil fatty acid, 87 parts by weight of 1:1 tetrahydrofuran/dioxane and 1 part by weight of a spherical polyethylene having a molecular weight of 5,500, a melting point of 98° C. and a mean particle diameter of 15 μm and 0.5 part by weight of polydimethylsiloxane (viscosity 60,000 mPa.s) for 72 hours in a steel ball mill of conventional design containing steel balls as the grinding medium.

A mixture of 50.5 parts by weight of a 16.5% strength polyurethane elastomer solution, 8.33 parts by weight of the 20% strength polyvinyl formal solution, 28.8 parts by weight of 1:1 tetrahydrofuran/dioxane and 0.25 part by weight of an oleic acid/stearic acid mixture were then added to this premilled dispersion, and dispersing was continued for a further 2 hours.

6.7 parts by weight of a 50% strength by weight triisocyanate, consisting of 3 mol of toluylene diisocyanate and 1 mol of trimethylolpropane, were added to the magnetic tape dispersion thus obtained, and the mixture was vigorously stirred and then filtered through a filter having a pore size of 3 μm.

A 7.5 μm thick polyethylene terephthalate film was coated with this dispersion using a knife coater, and the coating was passed through a magnetic field and then dried at 80° C. The magnetic layer was compacted and calendered by being passed between heated rollers (70° C., nip pressure 200 kg/cm). The resulting magnetic layer was 5 μm. The film coated in this manner was then slit into 3.81 mm wide tapes.

EXAMPLE 2

The procedure was as described in Example 1, except that the amount of the polyethylene was reduced from 1 to 0.5 part by weight.

COMPARATIVE EXPERIMENT 1

The procedure was as described in Example 1, but without the addition of the polyethylene.

EXAMPLE 3

The procedure was as described in Example 1, except that 1.2 parts by weight of a spherical polyethylene having a molecular weight of 5,500, a melting point of 101° C. and a mean particle diameter of 6 μm were added.

COMPARATIVE EXPERIMENT 2

The procedure was as described in Example 1, except that the polyethylene was replaced with one having a molecular weight of 1,000, a melting point of 88° C. and a particle size of 60 μm.

COMPARATIVE EXPERIMENT 3

The procedure was as described in Example 3, except that, instead of the polydimethylsiloxane having a viscosity of 60,000 mPa.s, one having a viscosity of 600 mPa.s was used.

COMPARATIVE EXPERIMENT 4

In the magnetic layer according to Example 3, a polyvinyl ether soluble in tetrahydrofuran/dioxane and having a melting point of 48° C. and an average molecular weight of 3,500 was used instead of the polyethylene.

EXAMPLE 4

The procedure was as in Example 3, except that, instead of polydimethylsiloxane having a viscosity of 60,000 mPa.s, one having a viscosity of 500,000 mPa.s was used.

COMPARATIVE EXPERIMENT 5

The procedure was as described in Example 3, except that, instead of the polydimethylsiloxane having a viscosity of 60,000 mPa.s, one having a viscosity of 100 mPa.s was used.

COMPARATIVE EXPERIMENT 6

Example 4 was repeated without the addition of polydimethylsiloxane.

COMPARATIVE EXPERIMENT 7

The procedure was as described in Example 4, but without the addition of the polyethylene.

The tapes resulting from the Examples and Comparative Experiments were subjected to the following tests:

Test 1

Tendency to Stick After Storage at Elevated Temperatures

In this test, the force required to overcome any forces due to sticking between layer and film during unwinding is determined.

For this purpose, the tape to be tested is made up in a compact cassette (type C 90), wound under a defined torque and stored for 8 hours at 85° C. after which the resulting forces due to sticking are measured without braking. The comparative value used in each case is the maximum retaining force (stated in cN) occurring in the immediate vicinity of the hub.

Test 2

Wow and Flutter After Storage at Elevated Temperatures

Compact cassettes having poor running properties tend to exhibit greater wow and flutter after storage at elevated temperatures. The first playback after storage at elevated temperatures is particularly critical. The wow and flutter behavior according to IEC 386, the measure of speed fluctuations, was measured (modulation in % stated).

Test 3

Eluate Value

The eluate value in mg/l was determined according to DIN 38,414, page 4.

Test 4

Suitability for High Temperature and Humidity Conditions

Testing of the abrasion resistance of test tapes with regard to deposits on the recording/playback head (RPH) and capstan after storage and testing under high humidity and temperature conditions. Determination of the blocking rate.
Storage Conditions
Storage time: 4 weeks
Storage conditions: 40° C., 93% r.h.
Test samples: 10 units of C 60, C 90 or C 120

Test conditions
Test apparatus: Use of 10 drives, each with one RPH with a MU metal head seal
Tape speed: 9.5 cm/sec
Test samples: The cassettes stored under the conditions described above
Test time: 10 cassette cycles
Test conditions: 30° C., 93% r.h., acclimatization for at least 8 hours under test conditions The compact cassettes removed from the storage conditions are operated in the playback mode on the test apparatus. After the end of the cycle, the compact cassette is turned and restarted. This process is repeated up to the 10th cycle, and the individual compact cassettes always remain in the same test apparatus.

The deposits on the RPH and capstan are evaluated separately, in each case after the first and tenth cycle (ratings 1 to 6, where 1= no abrasion and 6= pronounced abrasion).

Test 5

Stability of Signal Level

Testing of the stability of signal level of the test tapes during 100 cycles and evaluation of the abrasion resistance of the test tape by assessing the deposits on the erase head (EH), RPH and capstan.
Test conditions:
Test apparatus: Trio (Kenwood) 3-head recorder
Tape speed: 4.75 cm/sec
Recorded frequency: 8 kHz
Number of cassette cycles: 100
Signal chart recorder: from Bruel and Kjear, type 2305
Test conditions: 23° C. 50% r.h., acclimatization for at least 1 hour under the test conditions In each cycle, an 8 kHz signal is recorded at −7 dB recording level corresponding to the particular bias setting and is registered again behind the tape by the signal chart recorder.

The number of cycles which exhibit no drops in output level of > 2 dB or > 6 dB is evaluated.

The deposits on the EH, RPH and capstan are evaluated according to an existing Table (ratings 1 to 6).

Test 6

Coating Characteristics

Here, the surface of the magnetic layer is investigated for defects such as pitting or an orange peel structure.

TABLE

|  | Test 1 | Test 2 | Test 3 | Test 4 | Test 5 Cycles/drop >2 dB | >6 dB | Deposits EH | RPH | Capstan | Test 6 Coating characteristics |
|---|---|---|---|---|---|---|---|---|---|---|
| Example 1 | 0.7 cN | 1.0% | 2.8 g/l | 1.0/1.5 | >100 | >100 | 1.5 | 1.5 | 2.0 | no defects |
| Example 2 | 0.8 cN | 1.2% | 3.2 g/l | 1.0/2.0 | >100 | >100 | 1.5 | 1.5 | 2.0 | no defects |
| Comparative Expt. 1 | 1.2 cN | 1.5% | 4.3 g/l | 1.5/2.0 | >100 | >100 | 1.5 | 2.5 | 2.5 | slight defects |
| Example 3 | 0.7 cN | 1.2% | 0.6 g/l | 1.0/1.5 | >100 | >100 | 1.5 | 1.5 | 1.5 | no defects |
| Comparative Expt. 2 | 1.0 cN | 1.5% | 1.1 g/l | 2.5/3.0 | 80 | >100 | 2.5 | 2.5 | 2.0 | slight defects |
| Comparative Expt. 3 | 2.5 cN | 2.5% | 2.0 g/l | 2.0/3.0 | >100 | >100 | 1.5 | 2.0 | 2.5 | slight defects |
| Comparative Expt. 4 | 2.3 cN | blocks | 3.8 g/l | 3.5/3.5 | 28 | 52 | 3.5 | 4.5 | 4.0 | no defects |

TABLE-continued

| | Test 1 | Test 2 | Test 3 | Test 4 | Test 5 Cycles/drop >2 dB | >6 dB | Test 5 Deposits EH | RPH | Capstan | Test 6 Coating characteristics |
|---|---|---|---|---|---|---|---|---|---|---|
| Comparative Expt. 5 | 1.5 cN | squeals (not measurable) | 1.6 g/l | 2.5/3.0 | >100 | >100 | 1.5 | 2.0 | 2.5 | no defects |
| Comparative Expt. 6 | 1.8 cN | squeals | 1.2 g/l | 2.5/2.0 | >100 | >100 | 2.5 | 2.0 | 2.0 | no defects |
| Example 4 | 0.7 cN | 0.8% | 0.8 g/l | 1.5/1.0 | >100 | >100 | 1.5 | 1.0 | 1.5 | no defects |
| Comparative Expt. 7 | 1.4 cN | 1.1% | 1.0 g/l | 1.5/1.5 | >100 | >100 | 2.0 | 2.0 | 2.5 | slight defects |

We claim:

1. A magnetic recording medium obtained by preparing a dispersion of anisotropic magnetic material in a solution of a polymeric binder in an organic solvent, applying the dispersion as a layer to a nonmagnetizable substrate, then orienting the anisotropic magnetic material in a magnetic field and solidifying the applied magnetic layer, wherein a finely micronized, spherical particles of polyethylene or polypropylene having a particle diameter of less than 30 micrometers which are insoluble in the solvent used and have a melting point of more than 90° C. are present in the magnetic layer in an amount of from 0.1 to 8% by weight in combination with from 0.1 to 1.5% by weight of highly viscous polysiloxane having a viscosity of from 10,000 to 500,000 mPa.s, the percentages in each case being based on the amount of magnetic material.

* * * * *

UNITED STATES PATENT AND TRADEMARK OFFICE
CERTIFICATE OF CORRECTION

PATENT NO.: 5,470,650

DATED: November 28, 1995

INVENTOR(S): LEHNER et al.

It is certified that error appears in the above-identified patent and that said Letters Patent is hereby corrected as shown below:

On the title page, item [73], "Basi Magnetics GmbH" should read --BASF Magnetics GmbH--

Signed and Sealed this

Thirteenth Day of February, 1996

*Attest:*

BRUCE LEHMAN

*Attesting Officer*    Commissioner of Patents and Trademarks